United States Patent
Cenni et al.

[19]
[11] Patent Number: 6,095,216
[45] Date of Patent: *Aug. 1, 2000

[54] MULTI-PURPOSE TIRE FOR MOTOR-VEHICLES

[75] Inventors: Roberto Cenni, Merate; Gianfranco Colombo, Concorezzo, both of Italy

[73] Assignee: Pirelli Coordinamento Pneumatici SpA, Milan, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/679,675

[22] Filed: Jul. 12, 1996

[30] Foreign Application Priority Data

Jul. 14, 1995 [IT] Italy .................................. MI95A1534

[51] Int. Cl.$^7$ .............................. B60C 1/00; B60C 11/03; B60C 11/12; B60C 115/00
[52] U.S. Cl. ............................... 152/209.18; 152/209.25; 152/209.27; 152/209.28; 152/905; 152/DIG. 3
[58] Field of Search ............................ 152/209 R, 209 D, 152/DIG. 3, 209.2, 209.5, 209.15, 209.18, 209.25, 209.27, 209.28, 905; D12/147

[56] References Cited

U.S. PATENT DOCUMENTS

| | | | |
|---|---|---|---|
| D. 316,842 | 5/1991 | Graas | D12/147 |
| 2,770,279 | 11/1956 | Harrison | 152/DIG. 3 |
| 4,299,264 | 11/1981 | Williams | 152/209 R |
| 4,796,683 | 1/1989 | Kawabata et al. | |
| 4,815,512 | 3/1989 | Gerresheim et al. | 152/209.18 |
| 4,962,801 | 10/1990 | Tsuda | 152/209 R |
| 4,986,324 | 1/1991 | Suzuki et al. | 152/209 R |
| 5,078,190 | 1/1992 | Wissbrock et al. | |
| 5,105,864 | 4/1992 | Watanabe et al. | 152/209 R |
| 5,198,047 | 3/1993 | Graas et al. | 152/DIG. 3 |
| 5,343,918 | 9/1994 | Fontaine | 152/209 R |
| 5,421,389 | 6/1995 | Favre et al. | 152/209 R |
| 5,435,364 | 7/1995 | Hasegawa et al. | 152/209.28 |
| 5,501,258 | 3/1996 | Sulkowski | 152/209 R |
| 5,610,221 | 3/1997 | Waddell et al. | 524/492 |

FOREIGN PATENT DOCUMENTS

| | | | |
|---|---|---|---|
| 1329112 | 5/1994 | Canada . | |
| 0325905 | 8/1989 | European Pat. Off. . | |
| 0422902 | 4/1991 | European Pat. Off. . | |
| 0434967 | 7/1991 | European Pat. Off. . | |
| 0438319 | 7/1991 | European Pat. Off. . | |
| 0485883 | 5/1992 | European Pat. Off. . | |
| 602989 | 6/1994 | European Pat. Off. | 152/209 R |
| 604383 | 6/1994 | European Pat. Off. | 152/209 D |
| 627332 | 12/1994 | European Pat. Off. . | |
| 3924017 | 3/1990 | Germany | 152/209 R |
| 2182505 | 7/1990 | Japan . | |
| 3074208 | 3/1991 | Japan . | |
| 74208 | 3/1991 | Japan | 152/209 R |
| 126612 | 4/1992 | Japan | 152/209 R |
| 305308 | 11/1994 | Japan | 152/209 D |

OTHER PUBLICATIONS

Translation for Europe 604383.
European Search Report, 2 pages, Feb. 23, 1996.

*Primary Examiner*—Steven D. Maki
*Attorney, Agent, or Firm*—Stevens, Davis, Miller & Mosher, L.L.P.

[57] ABSTRACT

A tire is described which has a tread pattern provided with a large central channel (2) interposed between two continuous circumferential ribs (8), and a pair of large circumferential grooves (4) located at symmetrically opposite positions relative to the central channel (2). Also provided are transverse grooves (3) having a symmetrically converging inclined extension, the axial inclination of which increasingly grows larger towards the central channel (2). The longitudinal grooves (4) each consist of a sequence of oblique portions (4a) giving the grooves a broken-line course, so that each land portion or block (5, 6) delimited by the grooves (3, 4) has a corner (5a, 6a) projecting inwardly of the corresponding circumferential groove (4) with respect to the opposite corner (5b, 6b) of the circumferentially adjacent block.

31 Claims, 2 Drawing Sheets

MULTI-PURPOSE TIRE FOR MOTOR-VEHICLES

BACKGROUND OF THE INVENTION

1. Field of the Invention

The present invention relates to a multi-purpose tire for motor-vehicles.

More particularly, it pertains to the tread pattern of the tire in question, which is particularly appropriate for tires to be used on motor-vehicles envisaged for offering good performance both on a dry road and on a wet and even snow-covered road.

2. Discussion of the Related Art

It is known that in tires of the multi-purpose type the pattern and blend of the tread band must be conveniently studied so that they should be capable of meeting the different requirements specifically demanded with reference to the behavior the tire must have on the different types of road-beds for which its use is contemplated, that is not only on a dry or wet road-bed, but also on a snow-covered road-bed.

These requirement s are, on the other hand, in conflict with each other, so that hitherto-manufactured tires usually represent a compromise solution among the different requirements, and in any case they never reach the performance level achieved by a tire specifically conceived for use on a given type of road-bed, be it dry, wet or snow-covered.

Generally speaking, and leaving out of consideration the use for which it has been conceived, a good tire must have, among other things, superior features in terms of directional control and traction capability, as well as resistance to wear.

The directional control features, consisting in the tire capability to maintain the set trajectory in a precise manner, are positively affected by the presence of longitudinal grooves, whereas the traction capability features, consisting in the tire capability to transmit tangential forces both in accelerating and braking, are increased by arranging grooves oriented in a direction transverse to the running direction. The efficiency of these transverse grooves for traction capability purposes increases as the groove orientation approaches a direction parallel to the tire axis, so that usually for such grooves angles included between 45° and 90° are selected.

After the above preliminary remarks, it should be noted that as regards tires especially conceived for being run on a dry road-bed, the number and width of both longitudinal and transverse grooves tend to be reduced so as to improve resistance to wear, running noiselessly and smoothly of the tire.

As regards running on a wet road-bed, on the contrary, a greater groove width is desired, above all with reference to the circumferential grooves the task of which is that of discharging the water gathered on the ground-contacting area of the tire so as to avoid the occurrence of the well-known and dangerous aquaplane effect.

Finally, with reference to running on a snow-covered road-bed, a great number of cuts or narrow grooves is required, so as to conveniently hold the snow picked up from the road-bed, because—as it is well known, a snow-on-snow friction coefficient is greater than a rubber-on-snow friction coefficient.

It clearly appears from the foregoing that many difficulties are encountered when one wishes to manufacture a multi-purpose tire which simultaneously should meet all stated requirements which are in conflict with each other and specifically emerge with reference to running on a dry, wet or snow-covered road-bed.

In fact, arrangement of the circumferential wide grooves is in contrast both with the running requirements on a dry road-bed preferring grooves of reduced sizes to increase the land portion of the tread pattern so as to improve the resistance to wear and running noiselessness of same, and with the running requirements on a snow-covered road-bed, in which case wide grooves by promoting self-cleaning of the tread pattern cause a limitation in the behavioral features of the tire, in particular traction capability and roadholding.

The great number of cuts required for use on a snow-covered road-bed is in turn also in contrast with the running requirements on a dry road, because a too great number of cuts involve greater susceptibility to deformation of the land portions or blocks (which will bring about a noise increase and greater wear), as well as a reduction in the running stability and smoothness.

As a result, therefore, present multi-purpose tires have a moderately good roadholding on a wet road-bed, in any case lower than that of modern tires specifically studied for being run on a wet road-bed, a moderately good traction capability on snow, but lower than that achieved with tires specifically studied for winter climates, as well as an acceptable resistance to wear and sufficient roadholding on a dry road-bed, however without reaching the same level as the best "summer tires" available on the market.

SUMMARY OF THE INVENTION

In accordance with the present invention, it has been found that by making a grooved composite pattern in a tread, with a wide central channel adapted to drain water from the ground-contacting area of the tire under running conditions on a wet road-bed, transverse grooves adapted to ensure traction on a dry road-bed, as well as longitudinal grooves to ensure a good directional control both on a dry and on a wet road-bed, and by making said longitudinal grooves in the form of a sequence of portions oriented obliquely to the circumferential direction, excellent behavioral qualities are achieved among a dry, or a wet, or a snow-covered road-bed, which qualities are surprisingly higher than those of all known multi-purpose tires and substantially of the same level of performance as the most modern tires specifically studied for each of the above uses.

In more detail the invention relates to a tire for motor-vehicles having a tread pattern of the multi-purpose type comprising:

a central channel extending circumferentially at a centered position with respect to the equatorial plane "X" (FIG. 1) of the tire; two series of circumferentially-distributed transverse grooves disposed at laterally-opposite positions relative to the central channel and having a substantially inclined extension, symmetrically converging towards the circumferential channel itself; at least two circumferential grooves symmetrically spaced apart from the central channel and delimiting, together with the transverse grooves, two rows of center blocks extending at symmetrically side-by-side positions relative to the central channel, and two rows of shoulder blocks extending adjacent to the opposite side edges of the grooved composite tread pattern; each of said circumferential grooves being defined by a sequence of parallel portions, oriented obliquely to the circumferential direction, in order to give the groove itself a broken-line course and each portion delimiting the mutually opposite circumferential edges of a center block and a shoulder block, so that each of said center and shoulder blocks has a corner projecting inwardly of the circumferential groove with respect to the opposite corner of the circumferentially adjacent block.

In particular, the oblique portions of the two circumferential grooves converge in mirror image relationship towards the central channel, in a concordant direction with the converging direction of said transverse grooves, forming an inclination angle included between 2° and 5° with the circumferential direction.

Preferably said central channel has a width included between 3% and 5% of the overall width of the grooved composite tread pattern, and a depth included between 6 and 10 mm, said central channel being delimited by two side walls diverging towards the external surface of the composite tread pattern according to an angle included between 3° and 12°.

In more detail, said side walls are joined to the central-channel bottom and the external surface of said composite pattern by arcs of a circle the radius of curvature of which is included between 2 and 5 mm.

Preferably, said circumferential grooves have a width, measured perpendicularly to the longitudinal extension of said oblique portions, between 5 and 10 mm. The transverse grooves have an increasingly growing inclination and an increasingly diminishing width towards the central channel.

In more detail, said transverse grooves each have a first portion extending at the shoulder blocks according to a given axial inclination, preferably included between 2° and 8°, and a second portion extending at the center blocks according to an axial inclination greater than that of the first portion, preferably included between 15° and 45°.

In a preferential solution, following the first portion of each transverse groove there is an intermediate portion opening into the corresponding circumferential groove and having an axial inclination of a value included between those of the axial inclinations of the first and second portions.

According to a further feature of the invention, said shoulder blocks have first lamelliform cuts comprising transverse lamellae inclined in the opposite direction to the transverse grooves. In more detail, the first lamelliform cuts each consist of two transverse lamellae circumferentially staggered relative to each other and interconnected by a circumferential connecting cut completely crossing one of said transverse grooves.

It is also provided that the transverse lamellae should slightly project, each beyond the respective intersection point with the circumferential cut.

Advantageously, said center blocks have lamelliform auxiliary cuts shaped in the same manner as the first lamelliform cuts of the shoulder blocks and circumferentially staggered relative to said shoulder cuts.

Still in accordance with a preferential embodiment of the invention, said central channel is interposed between two continuous circumferential ribs separated from the center blocks by respective circumferential boundary hollows of a depth included between 2 mm and ⅔ of the width of the central channel, whichever is larger.

In a further aspect, the invention relates to a tread pattern as above defined, formed in a tread band consisting of a blend containing a given amount of siliceous filling, in which the geometric-parameter values of at least part of the grooved composite tread patterns depend on the selected amount of said siliceous filling.

From some tests carried out by the Applicant, it has come out that this filling can be usefully selected in an amount greater than 15 parts by weight for one hundred parts of rubber, preferably lower than 75 parts, preferably included between 15 and 50 parts, and most preferably between 15 and 25 parts.

Further features and advantages will become more apparent from the detailed description of a preferred but non-limiting embodiment of a tire for motor-vehicles provided with a multi-purpose grooved tread according to the present invention, taken hereinafter, by way of non-limiting example, with reference to the accompanying drawings:

DETAILED DESCRIPTION OF THE INVENTION

Figure 1:
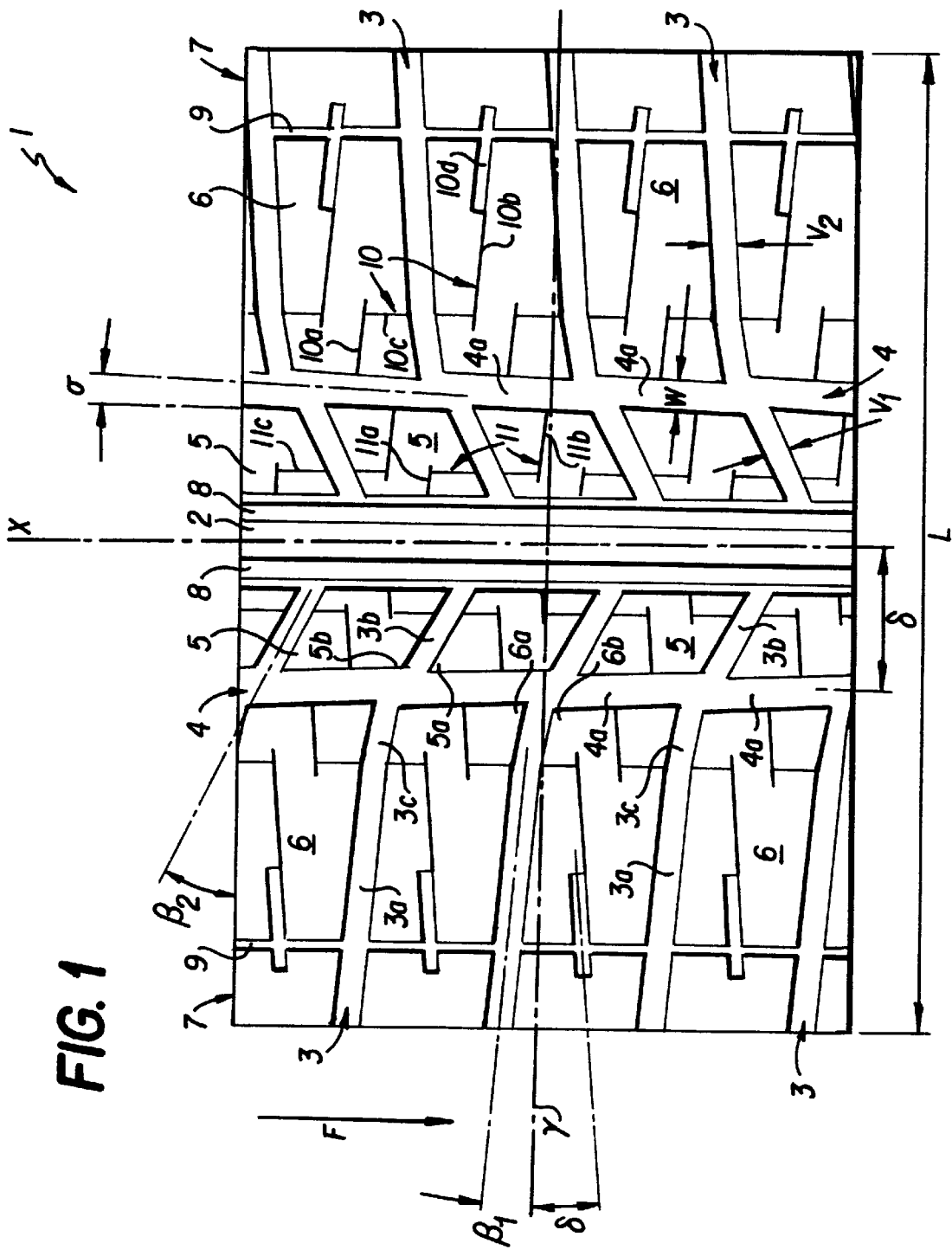
FIG. 1 is a plan view of a circumferential portion of the grooved composite tread pattern of the invention.

Referring particularly to FIG. 1, a tread pattern of the multi-purpose type for motor-vehicle tires grooved according to the present invention has been generally identified by reference numeral 1.

The tread band, preferably made of a blend of elastomeric material containing a reinforcing filling of siliceous material in an amount included between 15 and 25 parts by weight for one hundred parts of rubber, has a straight central channel 2 extending circumferentially in a centered position to the equatorial tire plane, denoted by axis "X" in FIG. 1 and having a depth "H" included between 6 and 10 mm, preferably of 8 mm.

Figure 2:
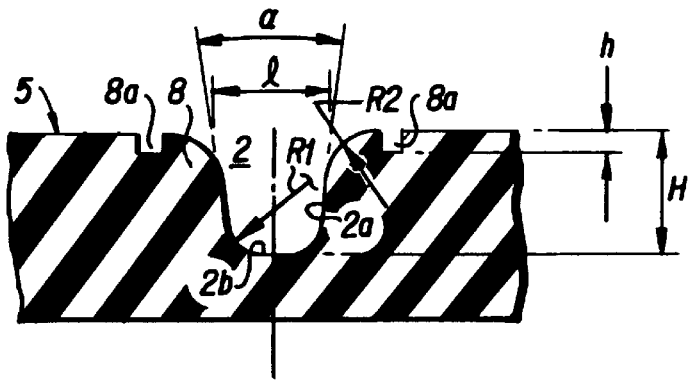
FIG. 2 is a fragmentary transverse sectional view, to an enlarged scale, of the grooved composite pattern shown in FIG. 1, taken at the central channel thereof.

Preferably, as shown in FIG. 2, the central channel 2 is delimited between two side walls 2a diverging towards the external surface "S" of the composite tread pattern 1 according to an angle "α" included between 6° and 24°, preferably of 16°. The side walls 2a are joined to the channel bottom 2b and the external surface "S" by internal and external arcs of a circle "R1" and "R2" respectively, the radius of curvature of which has a value included between 2 and 5 mm.

In a preferable embodiment, the value of radius "R1" for the internal arcs of a circle is provided to be equal to 2.7 mm, whereas the value of the radius of curvature "R2" for the external arcs of a circle is provided to correspond to 4 mm.

In addition, the central channel 2 has a width, identified by "ϵ" (FIG. 2) and delimited by the intersection points of the side wall "2a" projections with the surface "S", which is preferably included between 3% and 5% of the overall width "L" of the composite tread pattern. By way of example, for a tread pattern adapted to a tire of size 175/70 R 13 in which the overall width "L" of the composite tread pattern is 195 mm, the width "ϵ" of the central channel preferably corresponds to 7 mm.

The composite tread pattern 1 further has two series of transverse grooves 3 distributed circumferentially at laterally-opposite positions relative to the central channel 2, as well as at least two circumferential grooves 4 spaced apart symmetrically from the center line of the central channel 2 (equatorial plan "X") by a distance "d" included between 25 mm and 40 mm, preferably 30 mm.

The transverse 3 and longitudinal 4 grooves preferably have the same width as the central channel 2 and define two rows of rhomboidal center blocks 5 on the surface "S" of the composite tread pattern, which center blocks extend at symmetrically side-by-side positions relative to the central channel 2, and two rows of shoulder blocks 6, of substantially rhomboidal shape too, which extend along the opposite side edges 7 of the composite tread pattern.

The shoulder blocks 6 are separated from the side edges 7 by circumferential continuous external boundary hollows 9 preferably of a smaller width than the transverse grooves 3.

Advantageously, the transverse grooves 3 disposed, respectively, on opposite sides relative to the central channel 2, have a substantially inclined extension, symmetrically converging towards the circumferential channel itself, the angle of which becomes increasingly wider towards said channel.

In more detail, each transverse groove 3 has a first portion 3a extending at the shoulder blocks 6 according to a predetermined axial inclination "β1", and a second portion 3b extending at the center blocks 5 with an axial inclination "β2" greater than the axial inclination of the first portion 3a.

In more detail, with reference to the first portion 3a, the axial inclination, that is angle "β1" formed by said portion with a trajettory "Y" parallel to the tire axis, that is perpendicular to the equatorial plan "X", is provided to be included between 2° and 8°, and preferably to correspond to 4°30'. The axial inclination of the second portion 4b is in turn included between 15° and 45° and preferably is 25°.

It is also provided that the first portion 3a of each transverse groove 3 be followed by an intermediate portion 3c opening into the corresponding circumferential groove 4 and having an axial inclination of a value included between those of the axial inclinations "β1" and "β2" of the first and second portions 3a, 3b.

Advantageously, the extension of the transverse grooves 3 is interrupted before said grooves open into the central channel 2, by a pair of continuous circumferential ribs 8 delimiting the central channel on respectively opposite sides and having a rounded outline by effect of the arcs of the external circles "R2". Such circumferential ribs 8 preferably are separated from the center blocks 5 by respective inner-delimitation circumferential hollows 8a (FIG. 2), of a depth "h" (FIG. 2) included between 2 mm and ⅔ of the width of the central channel 2, whichever is larger, preferably in the order of 2–3 mm, and a width included between 1.5 and 2.5 mm, preferably equal to 1.8 mm. As shown in FIG. 1, ribs 8 have 0° sidewalls relative to the circumferential direction of the tire.

In a novel manner, as clearly shown in FIG. 1, each circumferential groove 4 is defined by a sequence of parallel portions 4a oriented obliquely to the circumferential direction, so as to give a broken-line course to the groove itself.

As can be seen from FIG. 1, each portion 4a delimits the respectively opposite circumferential edges of one of the center blocks 5 and one of the shoulder blocks 6, so that each center block 5 and shoulder block 6 has a corner 5a, 6a projecting inwardly of the circumferential groove 4 with respect to the opposite corner 5b, 6b of the circumferentially adjacent block 5, 6.

It is provided to advantage that the inclined portions 4a of the circumferential grooves 4 should converge in mirror image relationship towards the central channel 2, in a direction concordant with the converging direction of the transverse grooves 3, so that the projection of blocks 5, 6 is defined by an acute angle at the respective corners 5a, 6a.

More particularly, each inclined portion 4a of the longitudinal grooves 4 forms an angle of inclination "σ" included between 2° and 5°, and preferably of 3°, with the circumferential direction of the tire.

The width "W" of each circumferential groove 4, measured at right angles to the longitudinal extension direction of each oblique portion 4a, is included between 5 and 10 mm, and preferably corresponds to 7 mm.

Still in accordance with the present invention, the shoulder blocks 6 have first lamelliform cuts 10, each of which is formed of a sequence of cuts 10a, 10b, usually referred to as "lamellae" or "fins", of a depth smaller by about 1 mm than that of the longitudinal grooves 4 and transverse grooves 3. More particularly, each lamelliform cut 10 has an inner transverse lamella 10a and an outer transverse lamella 10b parallel to each other and circumferentially spaced apart, interconnected by a circumferential cut 10c, about 1 mm deep, extending parallel to the circumferential direction of the tire.

As viewed from FIG. 1, each circumferential cut 10c crosses one of the transverse grooves 3, preferably at the passage point between the first portion 3a and the intermediate portion 3c, so that each lamelliform cut 10 extends over two contiguous blocks 6.

The transverse lamellae 10a, 10b are advantageously inclined, with reference to the axial direction Y, in an opposite direction to the transverse grooves 3, preferably according to an angle "δ" of a value close to or equal to angle "β1" formed by the first portions 3a of said transverse grooves.

It is also provided that the transverse lamellae 10a, 10b should slightly project beyond their intersection point with the circumferential cut 10c.

In a preferred embodiment, the outer transverse lamellae 10b have an end portion 10d disposed in the extension of the lamella itself and crossing the external-delimitation hollow 9; this end portion 10d has a length included between 7 mm and 10 mm and preferably of 8 mm, and a width included between 1.5 and 2.5 mm, preferably of 2 mm.

Second lamelliform cuts 11 are also present. They are formed on the centre blocks 5 and shaped in the same manner as the first lamelliform cuts 10. In more detail, each lamelliform cut 11 has an inner transverse lamella 11a and an outer transverse lamella 11b, oriented according to said angle "δ" and mutually interconnected by a circumferential connecting cut 11c extending through the second portion 3b of the corresponding transverse groove 3.

According to a further feature of the present invention, the transverse grooves 3 have an increasingly larger width as they move away from the central channel 2. More particularly, the width "V1" of the transverse grooves 3 at the first portions 3b is provided to be included between 3 mm and 8 mm, and preferably it varies from a minimum value of 3 mm to a maximum value of 8 mm, moving away from the central channel 2. The detectable width "V2" at the first portions 3a, and at the intermediate portions 3c of the transverse grooves 3 is in turn included between 4 mm and 8 mm, and is at least constant but preferably increasingly larger, moving away from the central channel 2. From the above description, it is possible to see that the presence of the large central channel 2 and the circumferential grooves 4 gives the composite tread pattern 1 a high water-draining capability and therefore an excellent resistance to the aquaplane phenomenon.

It should be noted that the negative effects due to the projection of the block corners 5a, 6b inwardly of the circumferential grooves 5, that should adversely affect the water drainage from the ground-contacting area of the tire, are surprisingly eliminated in that they are efficiently compensated for by the fact that the central channel 2, as it is delimited between the continuous ribs 8, is completely devoid of side outlets and therefore all the water gathered at the central region of the ground-contacting area is pushed along the channel itself with a high pressure ensuring a quick evacuation of same. The water gathered at the tire shoulders is, on the contrary, evacuated by virtue of the angular variation in the axial direction of the transverse grooves 3, as well as the arrangement of same converging in a mirror image towards the central channel 2.

The siliceous material filling used in the blend of the tread band also helps in improving the tire adhesion, above all on a wet road; in addition, the orientation of the transverse grooves 3 which approaches the axial direction close to the edges 7 of the tread pattern, helps in improving the traction capability on every type of road-bed, which traction capability is further enhanced by the inclination of the oblique portions 4a forming the longitudinal grooves 4. In fact, corners 5a, 6a of blocks 5, 6 projecting inwardly of the circumferential grooves 4 substantially behave like a series of teeth exerting an efficient grip on any of a dry, or a wet, or a snow-covered road. In case of running on a snow-covered road-bed, the projecting corners 5a, 6a efficiently hold the snow, thereby improving the traction capability and adhesion even under these conditions.

Adhesion on the snow is further increased by the presence of the siliceous material as the reinforcing filling in the blend forming the tread band.

In this connection it has been found that the use of siliceous material in a given amount, as the reinforcing filling in the blend, has by itself the effect of increasing the grip features of the blend on a wet and snow-covered ground and therefore it advantageously integrates with the geometrical features of the inventive pattern, compensating for disadvantages and emphasizing the advantages connected with such features; more particularly, at least one of the features comprising shape, width, depth and inclination of the grooves and cuts in the tread pattern, is defined, within the above mentioned variability ranges, depending on the quantity of the siliceous material incorporated into the blend, so as to maximize the synergistic effect between the geometric features of the pattern and the physical features of the blend for the purpose of achieving the intended results.

For example, the negativeness of a specific width or of some grooves' orientation in respect of traction capability or roadholding can be advantageously compensated for by an appropriate amount of siliceous filling; this amount, always greater than 15 parts by weight for one hundred parts of rubber, is preferably lower than 75 parts, more preferably included between 15 and 50 parts and most preferably to 15–25 parts.

In particular, the use of the siliceous material available on the market from the company DEOUSSA under the commercial name "ULTRASIL VN3" has been found convenient.

The mirror orientation of the transverse grooves 3 gives the tire a tread pattern of a clearly directional type, wherein the preferring rolling direction is the one marked by arrow "F" in FIG. 1, leading the transverse grooves 3 to enter the ground-contacting area of the tire starting from their axially internal end. Advantageously, the presence of the lamelliform cuts 10, 11, involving transverse lamellae 10a, 10b, 11a, 11b oriented according to an opposite angle to that of the transverse grooves 3, ensures maintenance of an excellent grip on the road-bed even during a braking operation, when the tangential forces are directed in the opposite direction to that normally imposed by the torque, with reference to which the rolling direction "F" is allocated.

Figure 3:
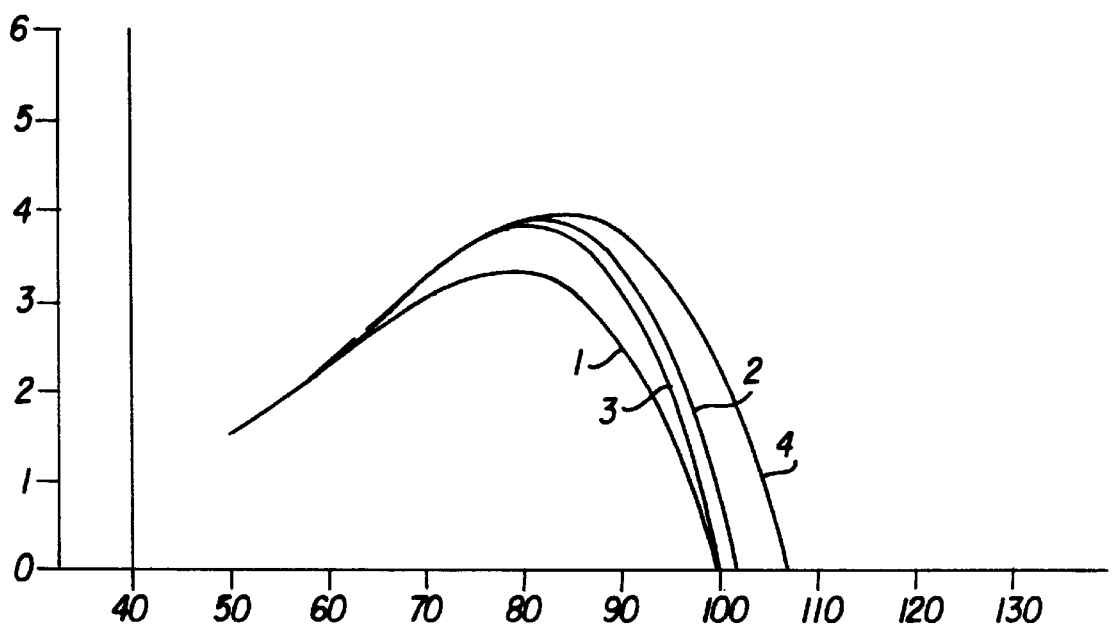
FIG. 3 is a graph obtained from comparative tests adapted to verify the aquaplane phenomenon on a bend.

Reproduced in Tables I, II, III and FIG. 3 are the results obtained from different comparative tests carried out on a prototype tire provided with a grooved tread pattern according to the above description, as compared with other tires available on the market.

In more detail, with reference to tables shown in Tables I and II, columns identified by 1, 2, 3 and 4 refer to the test results achieved on the following tire types, respectively:

column 1=a Pirelli tire "P 2000" particularly conceived for use on a dry road-bed;

column 2=a known tire provided with a central channel, particularly suggested for use on a wet road-bed;

column 3=a known tire specifically typified as "Energy", that is of the "low-rolling-resistance type";

column 4=a prototype tire having a carcass corresponding to that of a Pirelli tire P 2000, with a tread containing 20% of the siliceous filling and a composite tread pattern made in accordance with the present invention.

In all tests, tires had the following sizes: 175/65 R 14.

Referring particularly to Table I shown therein, the table reproduces the results achieved after driving tests on a track, on a dry road-bed, carried out with reference to behavioral qualities.

Rows A, B, C, D, E, F, G, H reproduced therein represent scores obtained by the individual tires with reference to the following entries, respectively:

A=directional running control on a straight stretch;
B=steering stiffness;
C=response quickness to steering;
D=progressive rate of response to steering;
E=direction stability on a bend;
F=insertion quickness on a bend;
G=transverse yielding;
H=ride comfort.

The awarded scores, on a 1 to 10 scale, show the obtained judgement with reference to the different aspects considered during the test, i.e. the better the results the higher the awarded score.

As can be seen from Table I, the behavior of the tire having the composite tread pattern according to the invention, with reference to a running on a dry road-bed, is substantially in line with the behavior of the tire (Pirelli "P 2000") having the same carcass structure and in which the composite tread pattern has been specifically studied for running on a dry road-bed, the results of which are reproduced in column 1. It is possible to note that the tire referred to in column 2, expressly conceived for enhancing performance on a wet road-bed, has quite lower behavioral features with reference to the test on a dry road-bed.

TABLE I

|   | 1 | 2 | 3 | 4 |
|---|---|---|---|---|
| A | 7 | 5 | 7 | 7 |
| B | 6½ | 5 | 7 | 6½ |
| C | 6½ | 5 | 7 | 6 |
| D | 6½ | 5 | 6½ | 6 |
| E | 7 | 5 | 7 | 6½ |
| F | 6 | 5½ | 6½ | 6½ |
| G | 6½ | 5½ | 6 | 7 |
| H | 6½ | 7 | 6½ | 6 |

In Table II, referred to the running behavior on a wet road-bed, rows A, B, C represent respectively:
A=control capability;
B=responsiveness to aquaplane phenomenon
C=traction capability.

TABLE II

|   | 1 | 2 | 3 | 4 |
|---|---|---|---|---|
| A | 5½ | 4½ | 6 | 6 |
| B | 6 | 7 | 6 | 6½ |
| C | 5½ | 4 | 6 | 6½ |

From said table one can see that the tire in reference has obtained, in all respects, higher average scores than those of all other tires tested. Only the tire referred to in column 2, expressly studied for use on a wet road-bed, has a better behavior specifically referred to the aquaplane phenomenon.

The graph in FIG. 3 shows the performance of the tested tires with reference to how they behave under aquaplane conditions on a bend.

More particularly, shown on the y-axis is the transverse acceleration achieved, in m/s2, depending on the running speed, reproduced on the x-axis in Km/h, on a bend.

Marked by 1, 2, 3 and 4 are the curves respectively obtained by the tires referred to in columns 1, 2, 3 and 4 in the tables shown in Tables I and II.

From this graph it is apparent that the tire provided with the tread pattern of the invention, shown by curve 4, has a better behavior than the three other tested tires, above all at relatively high speeds, due both to the higher transverse acceleration borne, and the higher speed achieved before the complete "aquaplane", that is a bearable transverse acceleration corresponding to zero.

Table shown in Table III reproduces the scores obtained by tires in a test for checking behavior of same on a snow-covered road-bed.

TABLE III

|   | 1 | 2 | 3 | 4 |
|---|---|---|---|---|
| A | 6 | 6½ | 6½ | 7½ |
| B | 6 | 6½ | 6 | 7½ |
| C | 6– | 7 | 6 | 8 |
| D | 6 | 6½ | 6 | 7½ |
| E | 6– | 6½ | 6– | 7½ |
| F | 6 | 6½ | 6 | 8 |
| G | 6 | 6½ | 6– | 7½ |

Referring to this table, columns 1, 2, 3 and 4 respectively relate to:

column 1=the known tire referred to in column 2 in tables 3 and 4, particularly envisaged for use on a wet road-bed;

column 2=a known tire specifically conceived for the so-called "All-Season" use;

column 3=Pirelli tire "P 2000", particularly envisaged for being run on a dry road-bed;

column 4=a prototype tire having the same carcass as tire "P 2000", with a tread containing 20% of siliceous filling and a grooved composite pattern made according to the present invention.

Rows A, B, C, D, E, F, G reproduce scores referred to the following behavioral aspects, respectively:
A=traction capability under pickup conditions (starting friction);
B=traction capability under running conditions (dynamic friction);
C=directional stability on a straight stretch;
D=side roadholding on a bend;
E=braking under grip conditions (unlocked wheels, active ABS);
F=braking under skidding conditions (locked wheels, inactive ABS);
G=driving power on pick-up.

From said table it clearly appears that the tire provided with a grooved tread according to the invention has, from all the examined points of view, an excellent running behavior on a snow-covered road-bed, not only with undoubtedly higher results than those of the tires referred to in columns 1 and 3, envisaged for a wet and a dry road-bed respectively, but, surprisingly, also with higher results with reference to those in column 2, concerning a tire specifically studied for "All-Season" use, and therefore openly of the winter type.

It is therefore apparent that the present invention has enabled different planning features to be integrated in the composite tread pattern, each of said features taken by itself being negative versus at least one of the different tire behaviors (since it is positive only versus one particular behavior alone) in such a synergistic combination that an exclusively positive overall result is achieved, that is equal to or better than the result found in known tires, taking into account any behavioral aspect on a road.

Obviously, many modifications and variations may be made to the invention as conceived, all of them falling within the scope of the annexed claims.

In particular, the dimensional parameters referring to the groove width have been allocated with reference to a prototype tire on the circumferential extension of which four different block-arrangement pitches are alternated (the block-arrangement pitch being represented by the circumferential extension of a block and the groove adjacent thereto), combined with each other to define a given "pitch sequence" of the tread.

Therefore, the groove sizes can undergo modifications with respect to the previously described values, even depending on the number of the foreseen pitches, which number in the composite tread pattern of the invention may vary between 2 and 4.

I claim:

1. A tire for motor-vehicles provided with a grooved tread band having a multi-purpose composite pattern, wherein said pattern comprises:

a central straight channel (2), defined by two continuous ribs to have two continuous edges, extending circumferentially at a centered position with respect to the equatorial plane ("X") of the tire, wherein each of the edges of the central channel extend straight, said central channel (2) having a width ("l") of between 3 to 5% of overall width ("L") of the grooved composite tread pattern (1);

two series of circumferentially-distributed transverse grooves (3) disposed at laterally-opposite positions relative to the central channel (2) and having a substantially inclined extension, symmetrically converging towards the circumferential channel itself, at least two circumferential grooves (4) symmetrically spaced apart from the central channel (2) and delimiting, together with the transverse grooves (3), two rows of center blocks (5) extending at symmetrically side-by-side positions relative to the central channel (2), and two rows of shoulder blocks (6) extending adjacent to opposite side edges (7) of the grooved composite tread pattern;

each of said circumferential grooves (4) being defined by a sequence of parallel portions (4a), oriented obliquely to the circumferential direction of the grooved composite tread pattern (1), in order to give the groove itself a broken-line course, and each portion delimiting the mutually opposite circumferential edges of a center block (5) and a shoulder block (6), so that each of said center (5) and shoulder (6) blocks has a corner (5a, 6a) projecting inwardly of the circumferential groove (4) with respect to the opposite corner (5b, 6b) of the circumferentially adjacent block (2), said oblique portions (4a) of the two circumferential grooves (4) converging towards the central channel (2) in a concordant direction with the converging direction of said transverse grooves (3), wherein said shoulder blocks have first lamellae cuts (10) comprising first transverse lamellae cuts (10a, 10b) inclined, relative to an axial direction of the tire, in the opposite direction to the transverse grooves (3) wherein said first lamellae cuts (10) each consist of two transverse lamellae cuts (10a, 10b) circumferentially staggered relative to each other and interconnected by a straight lamelliform connecting cut (10c) extending in a circumferential direction across only one of said transverse grooves.

2. A tire according to claim 1, in which each oblique portion (4a) of the circumferential grooves (4) forms an inclination angle included between 20 and 50 with the circumferential direction.

3. A tire according to claim 2, wherein the inclination angle is included between 2° and 3°.

4. A tire according to claim 1, in which said circumferential grooves (4) have a width ("W"), measured perpendicularly to the longitudinal extension of said inclined portions (4a), included between 5 mm and 10 mm.

5. A tire according to claim 1, in which said central channel (2) has a depth ("H") included between 6 and 10 mm.

6. A tire according to claim 1, in which said central channel (2) is delimited by two side walls (2a) diverging towards the external surface ("S") of the composite tread pattern according to an angle ("α") included between 6° and 24°.

7. A tire according to claim 1, in which side walls (2a) of the central channel (2) are joined to a central-channel bottom (2b) of the central channel (2) and the external surface ("S") of said composite tread pattern by arcs of a circle ("R1", "R2") the radius of curvature of which is included between 2 and 5 mm.

8. A tire according to claim 1, in which said transverse grooves (3) have an increasingly growing axial inclination towards the central channel (2) and the tire has at most two rows of the center blocks.

9. A tire according to claim 8, in which said transverse grooves (3) each have a first portion (3a) extending at the shoulder blocks (6) according to a given axial inclination ("β1") and a second portion (3b) extending at the center blocks (5) according to an axial inclination ("β2") greater than the axial inclination ("β1") of the first portion (3a).

10. A tire according to claim 9, in which the axial inclination ("β1") of said first portion (3a) is included between 2° and 8°.

11. A tire according to claim 9, in which the axial inclination ("β2") of said second portion (3b) is included between 15° and 40°.

12. A tire according to claim 11, wherein the axial inclination (β2) of said second portion (3b) is included between 15° and 25°.

13. A tire according to claim 9, further comprising the first portion (3a) of each transverse groove (3) followed by an intermediate portion (3c) opening into the corresponding circumferential groove (4) and having an axial inclination of a value included between those of the axial inclinations (β1", "β2") of the first and second positions (3a, 3b).

14. A tire according to claim 8, in which said transverse grooves (3) have an increasingly larger width as they move away from the central channel (2).

15. A tire according to claim 1, in which said transverse lamellae cuts (10a, 10b) slightly project each beyond the respective intersection point with the circumferential cut (10c).

16. A tire according to claim 1, wherein the circumferential lamellae cuts (10c) are about 1 mm deep.

17. A tire according to claim 1, in which said center blocks (5) have second lamellae cuts (11) comprising second transverse lamellae cuts (11a, 11b) inclined at the same angle as the first transverse lamellae cuts (10a, 10b) of the shoulder blocks (6).

18. A tire according to claim 17, in which each said second lamellae cuts (11) comprise two said transverse lamellae cuts (11a, 11b) circumferentially staggered relative to each other and interconnected by a lamelliform connecting cut (11c) extending in a circumferential direction.

19. A tire according to claim 1, wherein said circumferential ribs (8) defining said central channel (2) being separated from the center blocks (5) by respective circumferential internal boundary hollows (8a).

20. A tire according to claim 19, wherein the circumferential internal boundary hollows (8a) have depth (b) of at least 2 mm and, if the value of ⅔ of the width of the central channel is greater than 2 mm then the depth of the circumferential internal boundary hollows ranges from 2 mm to ⅔ the depth of the central channel, and the circumferential internal boundarm hollows (8a) have a width between 1.5 mm and 2.5 mm.

21. A tire according to claim 1, in which said tread band is made of elastomer material and a reinforcing filling of siliceous material, said reinforcing material being present in an amount included between 15 and 25 parts by weight per one hundred parts by weight of the elastomer material.

22. A tire according to claim 1, wherein the ribs have 0° sidewalls relative to the circumferential direction of the tire.

23. A tire according to claim 1, wherein the center blocks (5) and shoulder blocks (6) have a substantially rhomboidal shape.

24. A tire according to claim 1, wherein the side edges (7) are separated from the shoulder blocks (6) by circumferential continuous external boundary hollows.

25. A tire according to claim 1, wherein said shoulder blocks further comprise outer transverse lamellae cuts (10d) extending from said first transverse lamellae cuts (10b) to said circumferential continuous external boundary hollows, said outer transverse lamellae cuts (10d) being of greater circumferential width than said first transverse lamellae cuts (10b).

26. A tire according to claim 1, wherein the side edges (7) are separated from the shoulder blocks (6) by circumferential continuous external boundary hollows, said transverse grooves (3) delimiting said side edges to form side edge blocks, wherein each of said shoulder blocks (6) further comprise a outer transverse lamellae cut (10d) extending, in a direction longitudinally aligned with, a respective one of said first transverse lamellae cuts, from said respective one of said first transverse lamellae cuts (10b) to said side edge blocks (7), such that said outer transverse lamellae cuts (10d) each have a first portion cut into a respective said shoulder block and a second portion cut into a respective said side edge block (7), said first and second portions of each of said outer transverse lamellae cuts (10d) being aligned, said outer transverse lamellae cuts (10d) being of greater circumferential width than said first transverse lamellae cuts (10b).

27. A tire according to claim 26, wherein said second portions of each outer transverse lamellae cuts (10d) form blind hollows in said side edge blocks (7).

28. A tire according to claim 1, wherein the transverse grooves on opposed sides of the tire equator are offset.

29. A tire according to claim 1, wherein said transverse grooves (3) each have a first portion (3a) extending at the shoulder blocks (6) according to a given first angle of axial inclination ("β1") and a second portion (3b) extending at the center blocks (5) according to a second angle of inclination ("β2") greater than the first angle of axial inclination ("β") of the first portion, the first transverse lamellae cuts (10a, 10b) are axially inclined in the opposite direction to the transverse grooves (3) at a third angle ("δ"), wherein the absolute value of the third angle is close to or equal to the absolute value of the first angle ("β1") formed by the first portion (3a) of the transverse groove (3).

30. A tire according to claim 1, wherein for each of said first lamellae cuts, one of said two transverse lamella (10a) contacts a respective portion (4a) of the circumferential groove (4).

31. A tire for motor-vehicles provided with a grooved tread band having a multi-purpose composite pattern wherein said pattern comprises:

a central straight channel (2), defined by two continuous ribs to have two continuous edges, extending circumferentially at a centered position with respect to the equatorial plane ("X") of the tire, wherein each of the edges of the central channel extend straight, said central channel (2) having a width ("ε") of between 3 to 5% of overall width ("L") of the grooved composite tread pattern (1);

two series of circumferentially-distributed transverse grooves (3) disposed at laterally opposite positions relative to the central channel (2) and having a substantially inclined extension, symmetrically converging towards the circumferential channel itself:

at least two circumferential grooves (4) symmetrically spaced apart from the central channel (2) and delimiting together with the transverse grooves (3), two rows of center blocks (5) extending at symmetrically side-by-side positions relative to the central channel (2), and two rows of shoulder blocks (6) extending adjacent to opposite side edges (7) of the grooved composite tread pattern;

each of said circumferential grooves (4) being defined by a sequence of parallel portions (4a) oriented obliquely to the circumferential direction of the grooved composite tread pattern (1) in order to give the groove itself a broken-line course, and each portion delimiting the mutually opposite circumferential edges of a center block (5) and a shoulder block (6), so that each of said center (5) and shoulder (6) blocks has a corner (5a, 6a) projecting inwardly of the circumferential groove (4) with respect to the opposite corner (5b, 6b) of the circumferentially adjacent block (2), said oblique portions (4a) of the two circumferential grooves (4) converging towards the central channel (2) in a concordant direction with the converging direction of said transverse grooves (3), wherein said shoulder blocks have first lamellae cuts (10) comprising first transverse lamellae cuts (10a, 10b) inclined, relative to an axial direction of the tire, in the opposite direction to the transverse grooves (3), wherein the side edges (7) are separated from the shoulder blocks (6) by circumferential continuous external boundary hollows, said transverse grooves (3) delimiting said side edges to form side edge blocks, wherein each of said shoulder blocks (6) further comprise a outer transverse lamellae cut (10d) extending, in a direction longitudinally aligned with, a respective one of said first transverse lamellae cuts, from said respective one of said first transverse lamellae cuts (10b) to said side edge blocks (7), such that said outer transverse lamellae cuts (10d) each have a first portion cut into a respective said shoulder block and a second portion cut into a respective said side edge block (7), said first and second portions of each of said outer transverse lamellae cuts (10d) being aligned, said outer transverse lamellae cuts (10d) being of greater circumferential width than said first transverse lamellae cuts (10b), wherein each shoulder block is delimited by a first said transverse groove (3) and a second said transverse groove (3), each shoulder block comprises two said first transverse lamellae cuts (10a, 10b), one of said outer transverse lamellae cuts (10d), a first lamelliform connecting cut (10c), and a second lamelliform connecting cut (10c), each said two first transverse lamellae cuts (10a, 10b) circumferentially staggered relative to each other, one of said two first transverse lamellae cuts (10a, 10b) extending to said circumferential groove (4) and the other of said two first transverse lamellae cuts (10a, 10b) extending to said one of said outer transverse lamellae cuts (10d), said first lamelliform connecting cut (10c) extending in a circumferential direction from one of said two transverse lamellae cuts (10a, 10b) to the first transverse groove (3), and said second lamelliform connecting cut (10c) extending in a circumferential direction from the other of said two transverse lamellae cuts (10a, 10b) to the second transverse groove (3), each of said lamelliform connecting cuts (10c) being circumferentially aligned with each other.

\* \* \* \* \*